United States Patent [19]

Asai et al.

[11] Patent Number: 5,686,510
[45] Date of Patent: Nov. 11, 1997

[54] BIAXIALLY ORIENTED POLYESTER FILM FOR LAMINATION ONTO METAL SHEET

[75] Inventors: Takeo Asai, Sagamihara; Kinji Hasegawa, Hachioji; Mitsumasa Ono, Sagamihara, all of Japan

[73] Assignee: Teijin Limited, Osaka, Japan

[21] Appl. No.: 339,876

[22] Filed: Nov. 10, 1994

Related U.S. Application Data

[63] Continuation of Ser. No. 111,060, Aug. 24, 1993, abandoned.

[30] Foreign Application Priority Data

Aug. 25, 1992 [JP] Japan .................................. 4-225759

[51] Int. Cl.⁶ .................................................... B32B 27/06
[52] U.S. Cl. ...................... 523/220; 524/423; 524/425; 524/493; 524/497; 524/601; 524/604; 524/605; 428/35.8; 428/458; 428/480
[58] Field of Search ........................... 523/220; 524/493, 524/497, 601, 604, 605, 423, 425; 428/35.8, 458, 480

[56] References Cited

U.S. PATENT DOCUMENTS

| | | | |
|---|---|---|---|
| 3,884,870 | 5/1975 | Dodson et al. | 260/40 R |
| 4,761,327 | 8/1988 | Hamano et al. | 428/220 |
| 4,778,708 | 10/1988 | Nishino et al. | 428/143 |
| 5,077,118 | 12/1991 | Hasegawa et al. | 428/149 |
| 5,240,779 | 8/1993 | Ono et al. | 428/458 |

FOREIGN PATENT DOCUMENTS

| | | |
|---|---|---|
| 0124291 | 11/1984 | European Pat. Off. . |
| 0415383 | 3/1991 | European Pat. Off. . |
| 0416618 | 3/1991 | European Pat. Off. . |
| A5170942 | 7/1993 | Japan . |

OTHER PUBLICATIONS

Database WPI Week 9116, Derwent Publications Ltd., London, GB; AN 91-114479 & JP-A-03 056 538 (Teijin K>K>) 12 Mar. 1991.

*Primary Examiner*—Paul R. Michl
*Assistant Examiner*—John J. Guarriello
*Attorney, Agent, or Firm*—Sherman and Shalloway

[57] ABSTRACT

A biaxially oriented polyester film made of a polyester composition, (A) which polyester composition comprises (a) an aromatic copolyester having a melting point of 210–245° C., (b) first inert fine solid particles having an average particle diameter of 0.05 to 0.6 μm, and (c) second inert fine solid particles having an average particle diameter of 0.3 to 2.5 μm, the ratio of the average particle diameter of the second inert fine solid particles to the average particle diameter of the first inert fine solid particles being at least 2.5, and the amounts of the components (b) and (c) being 0.01 to 3% by weight and 0.001 to 0.2% by weight, respectively, based on the total weight of the components (a), (b) and (c);

(B) which polyester film has a plane orientation coefficient of 0.08 to 0.16; and, (C) which polyester film shows excellent moldability when laminated onto a metal sheet and subjected to deep drawing.

A can for drinks, foods, etc. having excellent heat resistance and flavor-retaining property can be produced from a metal sheet onto which the above biaxially oriented polyester film is laminated.

13 Claims, No Drawings

BIAXIALLY ORIENTED POLYESTER FILM FOR LAMINATION ONTO METAL SHEET

This application is a continuation, of application Ser. No. 08/111,060, filed Aug. 24, 1993, now abandoned.

DETAILED DESCRIPTION OF THE INVENTION

The present invention relates to a biaxially oriented polyester film used for lamination onto a metal sheet. More particularly, the present invention relates to a biaxially oriented polyester film for lamination onto a metal sheet, which shows excellent moldability when it is laminated onto a metal sheet and the laminated metal sheet is made into a can by deep drawing or the like and which is suitable for production of a metal can (e.g. a can for drinks, a can for foods) having excellent heat resistance and flavor-retaining property.

Metal cans are generally coated at the inner and outer surfaces for the protection of said surfaces from corrosion. Recently, methods of achieving this rust protection without using any organic solvent have been developed for the simplification of the processes, the improvement in hygiene aspect, the elimination of environmental pollution, etc. and, as one such method, it has been tried to coat a metal sheet with a thermoplastic resin film. That is, researches are under way on a method of laminating a thermoplastic resin film onto a metal sheet such as tinplate, tin-free steel sheet, aluminum sheet or the like and then making the laminated metal sheet into a can by deep drawing or the like. Certain copolyester films have been found to be suitable as the thermoplastic resin film because of their excellency in moldability, heat resistance and flavor-retaining property (Japanese Laid-Open Patent Application No. 86,729/1991).

When a polyester film is used as said thermoplastic resin film, its lubricity and abrasion resistance have large influences on the workability during film production or in film application, as well as on the quality of product produced from said film.

That is, when a polyester film has insufficient lubricity, wrinkles occur in the film in its take-up step, and, when applied to, for example, a metal can, wrinkles are produced due to insufficient lubricity at the step of lamination onto a metal sheet. When a polyester film has insufficient abrasion resistance, the film undergoes pinholes and, in extreme cases, incurs film rupture during deep drawing. Thus, when a polyester film has insufficient lubricity and/or insufficient abrasion resistance, the film cannot be used for coating of the inside and outside surfaces of a metal can.

In general, the improvement of a magnetic recording film in lubricity and abrasion resistance is made by addition of inert fine particles to impart unevenness to the film surface in order to decrease the contact area between the film and the roll, the processing tool or the like. The larger the size of the fine particles in the material polymer is, the larger improvement in lubricity can be generally obtained.

In the conventional methods, there have been often added, as said inert fine particles, for example, calcium carbonate, titanium oxide, kaolin, etc. alone or in admixture (a combination of small and large particles) (Japanese Laid-Open Patent Publications Nos. 34,272/1976, 78,953/1977, 78,954/1977, 41,355/1978 and 71,154/1978).

However, in a step involving large deformation of film, such as deep drawing step in metal can manufacturing, voids formed at the interface between the film polymer and the particles during the deformation become larger with increase in size of the fine particles. As a result, the following problems occur. That is, protuberances of a gentle slope are formed; the film has a large friction coefficient in the processing; coming-off of particles takes place even from small scratches on the voids in polyester film formed during the processing; and these cause formation of pinholes and film rupture.

An object of the present invention is to provide a biaxially oriented polyester film showing excellent moldability when laminated onto a metal sheet and subjected to deep drawing.

Another object of the present invention is to provide a biaxially oriented polyester film which has improved lubricity and improved abrasion resistance owing to the presence of small voids around the inert fine particles and the film surface having appropriate roughness and which is suitable for use in can manufacturing.

Further objects and advantages of the present invention will become apparent from the following description.

The objects and advantages of the present invention are achieved by a biaxially oriented polyester film made of a polyester composition, (A) which polyester composition comprises:
  (a) an aromatic copolyester having a melting point of 210 to 245° C.,
  (b) first inert fine solid particles having an average particle diameter of 0.05 to 0.6 μm, and
  (c) second inert fine solid particles having an average particle diameter of 0.3 to 2.5 μm, the ratio of the average particle diameter of the second inert fine solid particles to the average particle diameter of the first inert fine solid particles being at least 2.5, and the amounts of the components (b) and (c) being 0.01 to 3% by weight and 0.001 to 0.2% by weight, respectively, based on the total weight of the components (a), (b) and (c);

(B) which polyester film has a plane orientation coefficient of 0.08 to 0.16; and (C) which polyester film shows excellent moldability when laminated onto a metal sheet and subjected to deep drawing.

In the present invention, the aromatic copolyester is preferably a copolyester in which the main acid component is terephthalic acid and the main glycol component is ethylene glycol.

The copolymer component may be an acid or an alcohol. The acid as copolymer component is selected from, for example, aromatic dicarboxylic acids such as isophthalic acid, phthalic acid and 2,6-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid. The alcohol as copolymer component is selected from, for example, aliphatic diols such as butanediol and hexanediol; and alicyclic diols such as cyclohexanedimethanol. They can be used alone or in admixture of two or more.

The proportion of the copolymer components differs depending upon the kind but they are copolymerized such that the resulting copolyester is allowed to have a melting point of 210 to 245° C., preferably 215 to 240° C., more preferably 220 to 235° C. When the melting point is lower than 210° C., the copolyester is inferior in heat resistance and is unable to withstand the heating treatment or the heat applied during printing step after can manufacturing. When the melting point is higher than 245° C., the copolyester has too high crystallinity and in consequence, the moldability is impaired. Herein, the melting point of the copolyester is measured by a method of determining a melting peak at a temperature elevation rate of 20° C./min, using Du Pont Instruments 910 DSC. In the method, the sample amount is approximately 20 mg.

The aromatic copolyester is preferably a copolyester containing ethylene terephthalate as the main recurring unit and ethylene isophthalate as the subsidiary recurring unit, particularly preferably an ethylene terephthalate/ethylene isophthalate copolyester in which isophthalic acid has been copolymerized in an amount of 10 to 14 mole %. Such a copolyester is advantageous for imparting the satisfactory flavor-retaining property.

The aromatic copolyester has a glass transition temperature of preferably 60° C. or higher, more preferably 70° C. or higher.

The copolyester used in the present invention can be advantageously produced by, for example, a method which comprises subjecting terephthalic acid, ethylene glycol and copolymer components to an esterification reaction and then subjecting the reaction product to a polycondensation reaction, or a method which comprises subjecting dimethyl terephthalate, ethylene glycol and copolymer components to an ester interchange reaction and then subjecting the reaction product to a polycondensation reaction.

The polyester composition, which constitutes the biaxially oriented polyester film of the present invention, comprises the above to mentioned copolyester (a) having a melting point of 210 to 245° C. and inert fine solid particles.

The inert fine solid particles consist of first inert fine solid particles (b) having an average particle diameter of 0.05 to 0.6 μm and second inert fine solid particles (c) having an average particle diameter of 0.3 to 2.5 μm. The average particle diameter of the second inert fine solid particles (c) is required to be at least 2.5 times as large as that of the first inert fine solid particles (b).

When the average particle diameter of the first inert fine solid particles is smaller than 0.05 μm, the resulting film has insufficient lubricity and its take-up property during film production deteriorates. When the average particle diameter is larger than 0.8 μm, the resulting film has pinholes formed starting from the coarse particles (e.g. particles of 10 μm or larger) or, in some cases incurs rupture, at the film portions which have been deformed by processings such as deep drawing in can manufacturing.

The average particle diameter of the first inert fine solid particles is preferably 0.08 to 0.5 μm, more preferably 0.1 to 0.4 μm.

When the average particle diameter of the second inert fine solid particles is smaller than 0.3 μm, the resulting film is unable to have further improved lubricity. When the average particle diameter is larger than 2.5 μm, the film undergoes coming-off of particles, pinhole formation and film rupture when deformed by deep drawing, and has low abrasion resistance.

The average particle diameter of the second inert fine solid particles is preferably 0.4 to 2.0 μm, more preferably 0.6 to 1.8 μm.

By combination use of the first inert fine solid particles and the second inert fine solid particles, the resulting film can have higher lubricity.

When the ratio of the average particle diameter ($d_B$) of the second inert fine solid particles to the average particle diameter ($d_A$) of the first inert fine solid particles, i.e. $d_B/d_A$ is smaller than 2.5, an effect ascribed to the incorporation of the second inert fine solid particles, i.e., improvement in lubricity, can not be achieved. The $d_B/d_A$ is preferably 3.0 or larger.

In the polyester composition of the present invention, the first inert fine solid particles (b) and the second inert fine solid particles (c) are contained in amounts of 0.01 to 3% by weight and 0.001 to 0.2% by weight, respectively, based on the total weight of the aromatic copolyester (a), the first inert fine solid particles (b) and the second inert fine solid particles (c).

When the content of the first inert fine solid particles is less than 0.001% by weight, the resulting film shows no sufficient improvement in lubricity. When the content exceeds 3% by weight, rupture of the film occurs frequently.

The content of the first inert fine solid particles is preferably 0.1 to 1.0% by weight, more preferably 0.2 to 0.5% by weight.

When the content of the second inert fine solid particles is less than 0.002% by weight, the resulting film shows substantially the same lubricity as that of a film containing only a small-sized particles. When the content is more than 0.25 by weight, the film has inferior abrasion resistance.

The content of the second inert fine solid particles is preferably 0.002 to 0.1% by weight, more preferably 0.005 to 0.05% by weight.

Each of the first and second inert fine solid particles may be made of any of an inorganic and an organic material. An inorganic material is preferred.

Examples of the inorganic inert fine particles include silica, alumina, titanium dioxide, calcium carbonate and barium sulfate. The organic inert fine particles can be exemplified by silicone particles.

Each of the first and second inert fine solid particles can be used alone or in admixture of two or more. Other lubricant(s) may also be used together as necessary.

According to the study by the present inventors, it is preferable that the first inert fine solid particles have a relationship, represented by the following formula, between the average particle diameter and weight proportion:

$$0.0072 d^{-0.65} \leq C \leq 0.80 d^{-0.44}$$

wherein d is the average particle diameter (μm) and C is the weight proportion (% by weight).

According to the study by the present inventors, it is further preferable that the first and second inert fine solid particles, particularly the second inert fine solid particles, have a particle diameter ratio (a ratio of long diameter to short diameter) of 1.0 to 1.2. That is, the study revealed that use of such particles provides a film excellent particularly in pinhole resistance. Examples of such particles are truly spherical silica, truly spherical titanium dioxide, truly spherical silicone resin particles and truly spherical crosslinked polystyrene resin particles.

The average particle diameter and particle diameter ratio of particles can be determined by vapor-depositing a metal on the surfaces of the particles, observing the images of the metal-coated particles through an electron microscope under the magnification of, for example, 10,000 to 30,000X to determine the long diameter, short diameter and diameter of circle converted from projected area, of each particle, and then applying them to the following formulas.

Average particle diameter=[total of each diameter of circle, converted from projected area, of measured particles]/[number of measured particles]

Particle diameter ratio=[average long diameter of particles]/[average short diameter of said particles]

Preferably, spherical lubricant particles have a sharp particle diameter distribution and a relative standard deviation of particle diameter (this indicates the sharpness of particle diameter distribution), of 0.5 or less, preferably 0.3 or less.

The relative standard deviation is calculated using the following formula.

$$\text{Relative standard deviation} = \sqrt{\frac{\sum_{i=1}^{n}(Di - \overline{D})^2}{n}} / \overline{D}$$

wherein

Di: diameter of circle converted from projected area, of each particle (μm), $\overline{D}$: average of each diameter of circle converted from projected area, of each particle, i.e.

$$\left( = \sum_{i=1}^{n} Di/n \right) (\mu m)$$

and n: number of particles.

In producing the polyester composition of the present invention comprising an aromatic copolyester and two kinds of inert fine solid particles, no special method is required and a known conventional method can be employed. There can be preferably employed, for example, a process which comprises adding inert fine solid particles to the reaction system in production of the aromatic copolyester.

In producing of the aromatic copolyester, there may be further added other additives such as antioxidant, heat stabilizer, ultraviolet absorber, antistatic agent and the like, as required.

In producing the polyester composition, there may be employed other process, for example, a process which comprises first preparing an aromatic copolyester containing no inert fine solid particles and subsequently melt-mixing this copolyester with the predetermined amounts of first and second inert fine solid particles, and then molding the composition into a film.

The biaxially oriented polyester film of the present invention can be produced by melt-extruding the above polyester composition through a die to obtain a film and subjecting the film to biaxial stretching and thermosetting.

The biaxially oriented polyester film of the present invention has a plane orientation coefficient of 0.08 to 0.16. When the plane orientation coefficient is smaller than 0.08, undesirably, the film undergoes cracking when subjected to deep drawing of high draw ratio. When the plane orientation coefficient is larger than 0.16, the film causes rupture during deep drawing, making the deep drawing itself impossible.

The plane orientation coefficient is preferably 0.09 to 0.15, more preferably 0.10 to 0.14.

Herein, the plane orientation coefficient is a value defined by the following formula.

$$f = [(n_x + n_y)/2] - n_z$$

wherein f: plane orientation coefficient, and $n_x$, $n_y$ and $n_z$: refractive indexes of film in transverse, longitudinal and thickness directions, respectively.

The refractive indexes in the above formula are measured as follows.

A polarizing plate analyzer is fixed to the eyepiece side of an Abbe's refractometer, and the refractive indexes of a film in said three directions are measured using a monochromatic light, NaD-ray. In this case, the mounting liquid is methylene iodide and the measurement temperature is 25° C.

The biaxially oriented polyester film satisfying the above plane orientation coefficient can be obtained, for example, by selecting a draw ratio in the longitudinal direction of 2.5 to 3.8 and a draw ratio in the transverse direction of 2.7 to 3.8 in consecutive biaxial stretching and a thermosetting temperature of 150 to 220° C., preferably 160 to 200° C. The biaxially oriented polyester film of the present invention has a thickness of preferably 6 to 75 μm, more preferably 10 to 75 μm, particularly preferably 15 to 50 μm. When the thickness is smaller than 6 μm, film rupture or the like tends to occur during the processing. When the thickness is larger than 75 μm, the film has an excessive quality and is uneconomical.

The biaxially oriented polyester film of the present invention shows excellent moldability when laminated onto a metal sheet and subjected to deep drawing.

The biaxially oriented polyester film of the present invention shows, for example, a deep drawability-2 (described later) of 0.1 mA or less when laminated onto a metal sheet and subjected to deep drawing.

The metal sheet onto which the polyester film of the present invention is to be laminated, is suitably selected from, for example, a tinplate, a tin-free steel sheet, an aluminum sheet or the like. The lamination of the polyester film onto the metal sheet can be effected, for example, by the following method (a) or (b).

(a) A film is laminated onto a metal sheet which has been heated to at least the melting point of the film, the laminate is rapidly cooled to make amorphous the surface layer (thin layer) of the film contacting with the metal sheet, whereby tight adhesion is obtained.

(b) A film is beforehand coated with an adhesive as a primer to form an adhesive layer thereon and the adhesive layer side of the film is laminated with a metal sheet. As the adhesive, there can be used a known resin adhesive such as epoxy adhesive, epoxy-ester adhesive, alkyd adhesive or the like.

The metal sheet onto which the biaxially oriented polyester film of the present invention has been laminated, can be suitably used for can manufacturing in particular.

Hence, according to the present invention there is also provided use of the biaxially oriented polyester film of the present invention, as a film for lamination onto a metal sheet for production of, for example, a metal can by deep drawing.

The biaxially oriented polyester film of the present invention, which comprises the above-mentioned aromatic copolyester (a), first inert fine solid particles (b) and second inert fine solid particles (c), does not undergo coming-off of particles and exhibits good abrasion resistance when laminated onto a metal sheet and subjected even to large deformation by deep drawing during can manufacturing.

A biaxially oriented polyester film obtained by adding the first and second inert fine solid particles to a homopolyester (e.g. polyethylene terephthalate) shows improved lubricity but no improvement in abrasion resistance.

The present invention is hereinafter described specifically by way of Examples.

EXAMPLES 1 to 5 AND COMPARATIVE EXAMPLES 1 to 5

In each of Examples and Comparative Examples, a copolyethylene terephthalate having an intrinsic viscosity of 0.60, which contained 0.4% by weight of titanium dioxide having an average particle diameter of 0.2 μm and 0.01% by weight of truly spherical silica having an average particle diameter of 1.3 μm [particle diameter ratio=1.07; relative standard deviation=0.1 ] and in which a copolymer component shown in Table 1 had been copolymerized, was melt-extruded at a temperature shown in Table 1 and then rapidly cooled to solidify to obtain an unstretched film.

Each of the unstretched films was stretched in the longitudinal and transverse directions and then, thermoset under the conditions shown in Table 1, to obtain biaxially oriented films each of 25 μm in thickness.

The plane orientation coefficients of the films are shown in Table 3.

TABLE 1

| | Copolymer component | | Melt-extrusion temp. (°C.) | Stretching in longitudinal direction | | Stretching in transverse direction | | Thermo-setting temp. (°C.) |
|---|---|---|---|---|---|---|---|---|
| | Kind | mole % | | Temp. (°C.) | Ratio | Temp. (°C.) | Ratio | |
| Example 1 | Isophthalic acid | 9 | 280 | 120 | 3.0 | 125 | 3.0 | 180 |
| Example 2 | Isophthalic acid | 12 | 275 | 120 | 3.0 | 125 | 3.0 | 180 |
| Example 3 | Isophthalic acid | 15 | 270 | 115 | 3.0 | 120 | 3.0 | 180 |
| Example 4 | Isophthalic acid | 18 | 265 | 115 | 3.0 | 120 | 3.0 | 180 |
| Example 5 | Sebacic acid | 15 | 275 | 100 | 3.0 | 105 | 3.0 | 180 |
| Comp. Example 1 | Not used (polyethylene terephthalate) | | 290 | 125 | 3.0 | 130 | 3.0 | 180 |
| Comp. Example 2 | Isophthalic acid | 5 | 290 | 125 | 3.0 | 130 | 3.0 | 170 |
| Comp. Example 3 | Isophthalic acid | 22 | 260 | 115 | 3.0 | 120 | 3.0 | 185 |
| Comp. Example 4 | Isophthalic acid | 12 | 280 | 130 | 2.8 | 135 | 2.9 | 205 |
| Comp. Example 5 | Isophthalic acid | 12 | 280 | 120 | 4.2 | 125 | 4.3 | 160 |

EXAMPLES 6 to 21 AND COMPARATIVE EXAMPLES 6 to 13

Biaxially oriented films were obtained in the same manner as in Example 2 with the exception that the kinds, particle diameters and contents of the two lubricants were changed as shown in Table 2.

The plane orientation coefficients of the films are shown in Table 3.

TABLE 2

| | Small-particles lubricant | | | Large-particles lubricant | | | Ratio of average particle diameter $(d_S/d_A)$ |
|---|---|---|---|---|---|---|---|
| | Kind | Particle diameter $d_A$ (μm) | Content (wt. %) | Kind | Particle diameter $d_S$ (μm) | Content (wt. %) | |
| Example 6 | Titanium dioxide | 0.07 | 0.4 | Silica | 1.3 | 0.01 | 18.6 |
| Example 7 | Titanium dioxide | 0.1 | 0.4 | " | 1.3 | 0.01 | 13.0 |
| Example 8 | Titanium dioxide | 0.4 | 0.4 | " | 1.3 | 0.01 | 3.3 |
| Example 9 | Titanium dioxide | 0.5 | 0.4 | " | 1.3 | 0.01 | 2.6 |
| Example 10 | Titanium dioxide | 0.2 | 0.02 | " | 1.3 | 0.01 | 6.5 |
| Example 11 | Titanium dioxide | 0.2 | 0.2 | " | 1.3 | 0.01 | 6.5 |
| Example 12 | Titanium dioxide | 0.2 | 0.5 | " | 1.3 | 0.01 | 6.5 |
| Example 13 | Titanium dioxide | 0.2 | 2.5 | " | 1.3 | 0.01 | 6.5 |
| Example 14 | Titanium dioxide | 0.2 | 0.4 | " | 0.55 | 0.01 | 2.8 |
| Example 15 | Titanium dioxide | 0.2 | 0.4 | " | 0.7 | 0.01 | 3.5 |
| Example 16 | Titanium dioxide | 0.2 | 0.4 | " | 1.8 | 0.01 | 9.0 |
| Example 17 | Titanium dioxide | 0.2 | 0.4 | " | 2.2 | 0.01 | 11.0 |
| Example 18 | Titanium dioxide | 0.2 | 0.4 | " | 1.3 | 0.002 | 6.5 |
| Example 19 | Titanium dioxide | 0.2 | 0.4 | " | 1.3 | 0.05 | 6.5 |
| Example 20 | Titanium dioxide | 0.2 | 0.4 | " | 1.3 | 0.18 | 6.5 |
| Example 21 | Titanium | 0.1 | 0.8 | " | 0.35 | 0.02 | 3.5 |

TABLE 2-continued

|  | Small-particles lubricant | | | Large-particles lubricant | | | Ratio of average particle diameter $(d_S/d_A)$ |
|---|---|---|---|---|---|---|---|
|  | Kind | Particle diameter $d_A$ (μm) | Content (wt. %) | Kind | Particle diameter $d_S$ (μm) | Content (wt. %) |  |
| Comp. Example 6 | Titanium dioxide | 0.03 | 0.4 | Silica | 1.3 | 0.01 | 43.3 |
| Comp. Example 7 | Titanium dioxide | 0.65 | 0.4 | " | 1.3 | 0.01 | 2.0 |
| Comp. Example 8 | Titanium dioxide | 0.2 | 0.005 | " | 1.3 | 0.01 | 6.5 |
| Comp. Example 9 | Titanium dioxide | 0.2 | 3.5 | " | 1.3 | 0.01 | 6.5 |
| Comp. Example 10 | Titanium dioxide | 0.2 | 0.4 | " | 0.25 | 0.01 | 1.3 |
| Comp. Example 11 | Titanium dioxide | 0.2 | 0.4 | " | 2.7 | 0.01 | 13.5 |
| Comp. Example 12 | Titanium dioxide | 0.2 | 0.4 | " | 1.3 | 0.0005 | 6.5 |
| Comp. Example 13 | Titanium dioxide | 0.2 | 0.4 | " | 1.3 | 0.22 | 6.5 |

Each of total 34 kinds of the films obtained in Examples 1 to 21 and Comparative Examples 1 to 1 to 13 was laminated onto the both sides of a tin-free steel sheet of 0.25 mm in thickness, which was beforehand heated at 230° C., each laminate was cooled with water and then cut into discs of 140 mm in diameter, each disc was subjected to three-stage deep drawing using a die and a punch to prepare containers of 55 mm in diameter having a seamless side (each container is hereinafter simply referred to as can).

The cans were subjected to the following observation and tests and evaluated by the following criteria.

(1) Deep drawability-1

A: The films at the inside and outside surfaces of a can are processed with no abnormality and show neither whitening nor rupture.

B: The films at the inside and outside surfaces of a can show whitening and rupture at the can top, or abrasion dust is observed on the die or the punch.

C: The films at the inside and outside surfaces of a can show partial rupture.

(2) Deep drawability-2

A: The films at the inside and outside surfaces of a can are processed with no abnormality, and show an electric current of less than 0.1 mA in the rust prevention test conducted for the film at the can inside surface (In this test, a 1% aqueous NaCl solution is placed in a can to be tested and an electrode is inserted thereinto. The electric current is measured at the time when a voltage of 6 V is applied with the can used as an anode. This test is hereinafter referred to as ERV test.).

B: The films at the inside and outside surfaces of a can show no abnormality, but the electric current in the ERV test is 0.1 mA or more and, when portions of the film through which electricity has passed are observed under magnification, there are found pinhole cracks starting from coarse lubricant particles.

In taking up a film into a roll form during film production step, the film take-up property was rated as B when the roll surface had small protuberances which were produced due to inferior lubricity, while it was rated as A when the rolled film had not such protuberances at its surface and the film could be wound smoothly.

The rating results for the above test items are shown in Table 3. As is apparent from the results of Table 3, the films of Examples show excellent deep drawability.

TABLE 3

|  | Melting point (°C.) | Plane orientation coefficient | Take-up property | Deep drawability 1 | Deep drawability 2 | Overall rating |
|---|---|---|---|---|---|---|
| Example 1 | 235 | 0.125 | A | A | A | good |
| Example 2 | 228 | 0.107 | A | A | A | good |
| Example 3 | 222 | 0.101 | A | A | A | good |
| Example 4 | 215 | 0.09 | A | A | A | good |
| Example 5 | 229 | 0.103 | A | A | A | good |
| Example 6 | 228 | 0.105 | A | A | A | good |
| Example 7 | 228 | 0.104 | A | A | A | good |
| Example 8 | 228 | 0.105 | A | A | A | good |
| Example 9 | 228 | 0.105 | A | A | A | good |
| Example 10 | 228 | 0.106 | A | A | A | good |
| Example 11 | 228 | 0.104 | A | A | A | good |
| Example 12 | 228 | 0.104 | A | A | A | good |
| Example 13 | 228 | 0.103 | A | A | A | good |
| Example 14 | 228 | 0.105 | A | A | A | good |
| Example 15 | 228 | 0.105 | A | A | A | good |
| Example 16 | 228 | 0.105 | A | A | A | good |
| Example 17 | 228 | 0.105 | A | A | A | good |
| Example 18 | 228 | 0.106 | A | A | A | good |
| Example 19 | 228 | 0.105 | A | A | A | good |
| Example 20 | 228 | 0.105 | A | A | A | good |
| Example 21 | 228 | 0.107 | A | A | A | good |
| Comparative Example 1 | 260 | 0.180 | A | C | — | poor |
| Comparative Example 2 | 247 | 0.171 | A | B | — | poor |
| Comparative Example 3 | 208 | 0.075 | A | A | A | poor* |
| Comparative Example 4 | 228 | 0.060 | A | A | B | poor |
| Comparative Example 5 | 228 | 0.180 | A | C | — | poor |
| Comparative Example 6 | 228 | 0.107 | B | C | A | poor |
| Comparative Example 7 | 228 | 0.105 | A | B | A | poor |
| Comparative Example 8 | 228 | 0.106 | B | C | A | poor |

TABLE 3-continued

| | Melting point (°C.) | Plane orientation coefficient | Take-up property | Deep drawability 1 | Deep drawability 2 | Overall rating |
|---|---|---|---|---|---|---|
| Comparative Example 9 | 228 | 0.106 | A | B | A | poor |
| Comparative Example 10 | 228 | 0.107 | B | B | A | poor |
| Comparative Example 11 | 228 | 0.105 | A | A | B | poor |
| Comparative Example 12 | 228 | 0.105 | B | C | A | poor |
| Comparative Example 13 | 228 | 0.104 | A | C | A | poor |

*Heat resistance is poor.

The polyester film for lamination onto a metal sheet according to the present invention has good lubricity, good abrasion resistance and excellent drawability, and is very useful for use in metal containers.

What is claimed is:

1. A biaxially oriented polyester film made of a polyester composition, which polyester composition consists essentially of:
   (a) an aromatic copolyester having a melting point of 210–245° C.,
   (b) first inert fine solid particles having an average particle diameter of 0.05 to 0.6 µm, and
   (c) second inert fine solid particles having an average particle diameter of 0.3 to 2.5 µm,
   wherein said first inert fine solid particles and said second inert fine solid particles each have a sharp particle diameter distribution and a relative standard deviation of particle diameter of 0.5 or less and
   the ratio of the average particle diameter of the second inert fine solid particles to the average particle diameter of the first inert fine solid particles being at least 2.5, and the amounts of the components (b) and (c) being 0.01 to 3% by weight and 0.001 to 0.2% by weight, respectively, based on the total weight of the components (a), (b) and (c);
   wherein the polyester film has a plane orientation coefficient of 0.08 to 0.16 and
   has excellent moldability when laminated onto a metal sheet and subjected to deep drawing.

2. The biaxially oriented polyester film set forth in claim 1, wherein the melting point of the aromatic copolyester is 215 to 240° C.

3. The biaxially oriented polyester film set forth in claim 1, wherein the aromatic copolyester has a glass transition temperature of 60° C. or higher.

4. The biaxially oriented polyester set forth in claim 1, wherein the aromatic copolyester contains ethylene terephthalate as a main recurring unit and ethylene isophthalate as a subsidiary recurring unit.

5. The biaxially oriented polyester film set forth in claim 1, wherein the average particle diameter of the first inert fine solid particles is 0.08 to 0.5 µm.

6. The biaxially oriented polyester film set forth in claim 1, wherein the relationship represented by the following formula exists between the average particle diameter and weight proportion of the first inert fine solid particles:

$$0.0072d^{-0.65} \leq C \leq 0.80d^{-0.44}$$

wherein d is the average particle diameter (µm) and C is the weight proportion (% by weight).

7. The biaxially oriented polyester film set forth in claim 1, wherein the weight proportion of the first inert fine solid particles is 0.1 to 1% by weight.

8. The biaxially oriented polyester film set forth in claim 1, wherein the second inert fine solid particles have a particle diameter ratio of long diameter to short diameter of 1.0 to 1.2.

9. The biaxially oriented polyester film set forth in claim 1, wherein the average particle diameter of the second inert fine solid particles is 0.4 to 2 µm.

10. The biaxially oriented polyester film set forth in claim 1, wherein the weight proportion of the second inert fine solid particles is 0.002 to 0.1% by weight.

11. The biaxially oriented polyester film set forth in claim 1, wherein the plane orientation coefficient is 0.09 to 0.15.

12. A biaxially oriented polyester film made of a polyester composition, which polyester composition consists essentially of:
   (a) an aromatic copoyester having a melting point of 220–235° C.,
   (b) first inert fine solid particles having an average particle diameter of 0.08 to 0.5 µm, and
   (c) second inert fine solid particles having an average particle diameter of 0.4 to 2.0 µm,
   wherein said first inert fine solid particles and said second inert fine solid particles each have a sharp particle diameter distribution and a relative standard deviation of particle diameter of 0.5 or less and
   the ratio of the average particle diameter of the second inert fine solid particles to the average particle diameter of the first inert fine solid particles being at least 3.0, and the amounts of the components (b) and (c) being 0.10 to 1.0% by weight and 0.002 to 0.1% by weight, respectively, based on the total weight of the components (a), (b) and (c); and said film having a thickness of 10 to 75 µm,
   wherein the polyester film has a plane orientation coefficient of 0.09 to 0.15 and has excellent moldability;
   which shows a deep drawability-(2) of 0.1 mA or less when laminated onto a metal sheet and subjected to deep drawing.

13. A biaxially oriented polyester film made of a polyester composition, which polyester composition consists essentially of:
   (a) an aromatic copolyester having a melting point of 210–245° C.,
   (b) first inert fine solid particles having an average particle diameter of 0.05 to 0.6 µm, and
   (c) second inert fine solid particles having an average particle diameter of 0.3 to 2.5 µm,
   wherein said first inert fine solid particles and said second inert fine solid particles each have a sharp particle diameter distribution and a relative standard deviation of particle diameter of 0.5 or less and
   the ratio of the average particle diameter of the second inert fine solid particles to the average particle diameter of the first inert fine solid particles being at least 2.5, and the amounts of the components (b) and (c) being 0.01 to 3.0% by weight and 0.001 to 0.2 by weight, respectively, based on the total weight of the components (a), (b) and (c);
   wherein the polyester film has a plane orientation coefficient of 0.08 to 0.16 and has excellent moldability;
   which shows a deep drawability-(2) of 0.1 mA or less when laminated onto a metal sheet and subjected to deep drawing.

* * * * *